LOW TEMPERATURE MERCURY OXIDE-ZINC BATTERY

Filed Sept. 1, 1972

United States Patent Office 3,827,916
Patented Aug. 6, 1974

3,827,916
LOW TEMPERATURE MERCURY OXIDE-ZINC BATTERY
Franklin G. Fagan, Jr., Ossining, N.Y., assignor to P. R. Mallory & Co., Inc., Indianapolis, Ind.
Filed Sept 1, 1972, Ser. No. 285,763
Int. Cl. H01m 21/06
U.S. Cl. 136—20                    8 Claims

ABSTRACT OF THE DISCLOSURE

A mercury oxide-zinc cell with a single or double anode structure between two concentric annular depolarizer cylinders, with interposed separator and absorbent layers as pre-wound tubes, essentially as two cell-pairs, back to back, to provide maximum exposed electrode surface areas of the depolarizer cylinders relative to the anode; with the anode or anodes being relatively thin and having about 65% porosity, and the cathode depolarizer cylinders being relatively thick of maximum attainable density; with an electrolyte having a composition of about seven molar KOH with about 2% Zinc Oxide; and with an absorbent consisting of a non-woven mat of polyamide (nylon) fibers; with the two cell-pairs having equal energy capacities so both will be exhausted in equal time periods.

---

Figure 1:
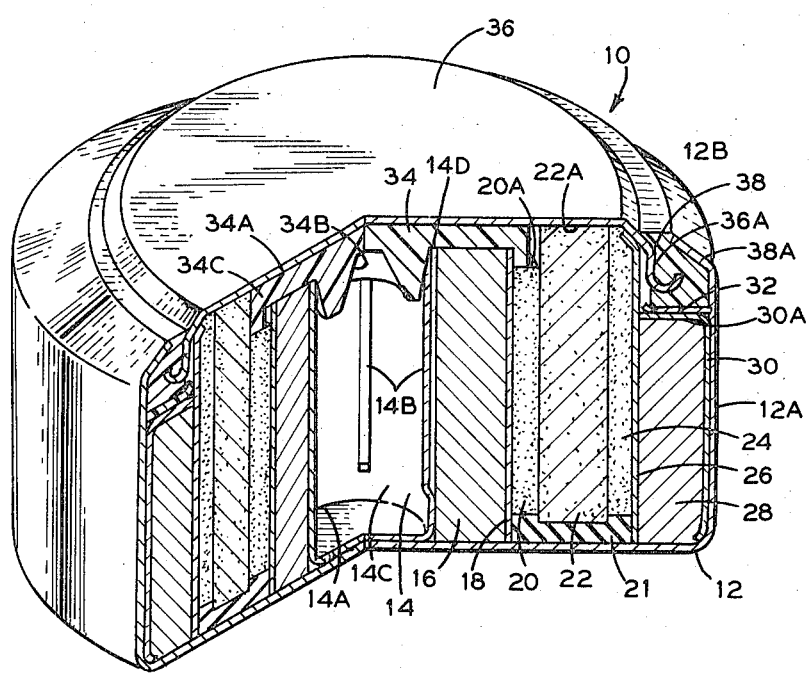

This invention relates to electric cell batteries and particularly to batteries for operation at low temperatures.

Mercury oxide-zinc electric cells have been found to be very satisfactory for general applications, because of their high efficiency, long storage life, and long operating life with a high optimum usefulness of the chemical ingredients in the cell, providing a high ratio of extracted energy and energy density, in relation to the volume of active chemicals in the cell.

In certain applications such as batteries for transceiver devices for air-sea rescue transceiver, the low ambient temperature in which the battery was required to function, introduced a problem of low temperature performance and storage-ability.

The invention disclosed herein is directed to a solution of that problem, by providing an improved and novel cell structure embodying certain new principles of construction and operation, which have proved to be effective at such previously troublesome low temperatures.

One of the initial design problems was imposed by the fact that the given dimension for the cell to which the invention was to be applied, were limited to a cylindrical volumetric space within a diameter slightly less than one inch and an axial depth slightly less than one-half inch.

In the construction of electric cells of this type, the conventional art has dictated a construction design of the cell, in which the anode unit is axially disposed within the cell and the cathodic depolarizer material is circumferentially disposed as an annular cylinder, concentric about and radially spaced from the axial anode. Thus, in this conventional relative disposition and arrangement of the anode and the cathode, only the internal peripheral surface of the depolarizer material and the external peripheral surface of the internal anode were involved in the electrochemical activity in the operation of the cell.

Moreover, conventional practice has dictated provision of a single anode unit structure surrounded by a single cylindrical cathodic depolarizer structure.

In the evolution of the invention of the presently disclosed cell, a different design arrangement has been developed, in order to provide greater effective utilization of the depolarizer structure. For that purpose, the depolarizer material has been sub-divided into two individual sections, and disposed to create, in effect, a twin cell unit, in which the anode element has ultimately become a common intermediate structural element for the two twin cell units, with each of the depolarizer elements respectively disposed on an opposite side of that intermediate common anode. With this arrangement of the primary elements of the twin cell units, greater surface area of the depolarizer material is made available for the current conduction to the common anode. Moreover, with consequent access to greater surface area of the depolarizer material during activity of the cell, the energy is available over a long operating interval in a current density adequate for the desired purpose.

The sub-division and new arrangement of the depolarizer material, as herein disclosed, has provided the advantageous feature sought after, namely, continued performance at the lower temperatures, down to as much as minus thirty degree centigrade, at which temperature present conventional cells stop functioning.

The separation of the depolarizer into two separate body units, to provide increased surface areas for current transfer, created additional problems of establishing conditions that would lead to optimum operation within each complete battery as manufactured. That problem was to evolve a design principle that would establish substantial uniformity in operation in batteries manufactured according to this invention.

To solve that problem, another controlling principle basic of this invention evolved, of matching the performance of the two units of each cell so the operating characteristics of the two twin units will be substantially congruent, and their operating life periods substantially equal. In that manner, the twin units of the cell expire at substantially the same time, so there will not be a condition where one twin cell unit will have given up all of its energy and will be through functioning, while the second twin unit is still continuing to function and creating a deceptive appearance of availability of energy but at a reduced voltage.

In order to achieve this condition of matching the performance of the two twin elements of the cell, it is necessary to functionally relate the parameters or variables of the components of the twin cell units, such as the volume, the area of the current transfer surfaces and the spacing, of the components which involves the respective dimensions of the components of the cell, and their disposition, within the space defined by the dimensions of the cell container.

With this concept of the function within the twin cell as a guiding principle, the relationships between the parameters are set up in a set of simultaneous equations relating the several parameters. The limiting dimensions of the cell serve to provide an independent constant parameter to which the other variables can be related, and the simultaneous equations solved to derive the dimensional parameters of the components.

A problem that is present in all small cells of the mercury oxide-zinc type, is the need to provide an absolute barrier between the anode element and the cathodic depolarizer material, because of the effect in the cell to erode the depolarizer material, which may cause possible release of particles from the depolarizer structure, and such particles could migrate into the intervening space toward the anode, and possibly cause shorting or other detrimental effects within the cell. In the present cell, that possibility of particle migration is aggravated, by the presence of two depolarizer bodies, and the present invention provides some additional structural features to overcome that problem. The improved operating characteristics of the cell of this invention attests to the effectiveness of the design shown herein.

Figure 2:
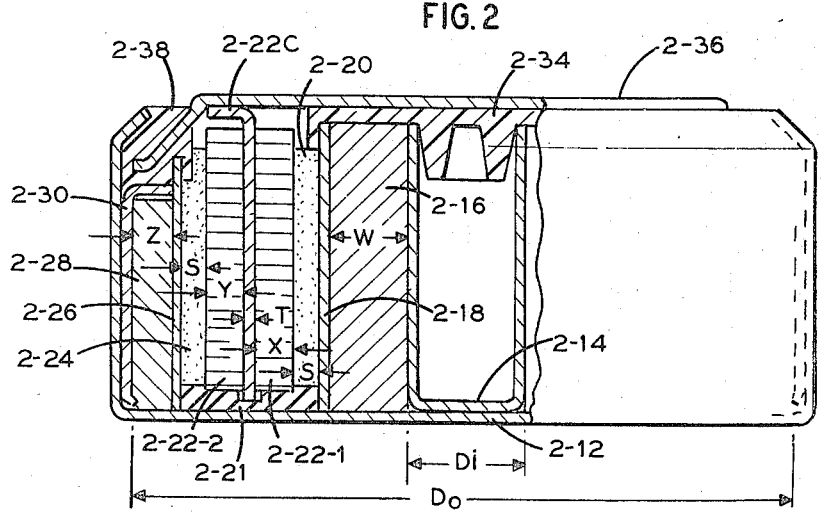

Other novel features of the invention are involved in the details of construction which are more fully described in the specification, as shown in the accompanying drawings, in which FIG. 1 shows a vertical sectional view of a cell of this invention, taken along two vertical planes meeting at the vertical axis of the cell; and FIG. 2 is a schematic view of a basic twin-unit or bi-cell model for use in computing cell parameters.

As shown generally in the drawings, an electric cell embodying this invention is formed as a twin-unit cell structure, in which two separate cylindrical cathode depolarizer structures are respectively disposed radially inside and radially outside of a common anode cylindrical structure; and the two depolarizer material cylinders and the common anode cylinder are so related, in structural dimensions and spacing, as to establish the operating characteristics of the two twin unit sections to be similarly such, that the two twin units of the cell will expire substantially at the same time. Thus, there is avoided a condition in a cell, in which one of the twin-unit sections will remain still effective while the other twin-unit section has been completely electro-chemically used up, but remains as a parallel dead load on the twin-unit section still able to function. According to the present invention, the two twin sections of the cell are made to have corresponding life periods, so that substantially no part of the overall cell is wasted in being still available for service, but ineffective because its companion part cell is already expired.

As shown in FIG. 1, a cell 10 constructed in accordance with this invention comprises, a steel outer can 12 of relatively cup shape; a central coaxially disposed hollow metal cylindrical depolarizer collector 14 also cup shaped and welded at its bottom to the steel outer can 12, as indicated by the welded symbol 14A; an inner annular cylinder 16 of depolarizer material surrounding and supported by said metal collector 14; an inner cylindrical separator 18 surrounding and engaging said depolarizer cylinder 16; an inner cylinder of absorbent material 20 surrounding and engaging inner separator 18; an annular neoprene insulator 21; an anode cylinder 22 that has a porous structure of suitable material, here a zinc powder amalgam mix and disposed to surround and engage said inner absorbent 20; next, an outer cylindrical absorbent 24 disposed to surround and engage the anode cylinder 22; next, an outer separator 26 of insulating material surrounding and engaging said absorbent 24; an outer or second cylinder of depolarizer material 28 supported and confined by a steel depolarizer sleeve 30 to surround and engage said outer separator 26, with said sleeve 30 of appropriate dimension to snugly slip-fit into the vertical side wall 12A of the steel outer can of the cell. The cell further comprises an insulating polyethylene annular washer 32 to seat on the steel depolarizer sleeve 30, and to serve as a barrier against migration of depolarizer particles to the space above said washer 32. A central coaxial plastic cap 34 serves several purposes. First, it has a central circular planar body 34A to support the central area of the cell top 36 to prevent buckling of that top. That plastic cap 34 receives its own support from the coaxial cylinder 14 as a centerpost for the cell. The coaxial cylinder 14, having body 14C, is slotted longitudinally with several slots 14B so the open free ends 14D of the cylinder may be shifted slightly radially outward. Said cap 34 also embodies a tapered coaxial boss 34B that extends coaxially downward into said cylindrical centerpost 14 to slightly spread free ends 14C radially outward into good electrical contact, under pressure, with the inner depolarizer cylinder 16.

The cell top 36 is of circular shape with its peripheral edge 36A flanged and curved to be anchored in a molded grommet 38 of appropriate dimension to snugly fit into the open end of the outer steel can 12 while the cell is being assembled. The grommet is shaped with an inclined surface 38A to receive the peened-over portion 12B of the can to provide a tight seal of the peened-over rim edge 12B against the molded grommet 38.

The downward pressure of the peened-over edge 12B of the outer can 12, presses the cell top 36 downward, and accomplishes several functions. The cell top 36 is held flat and taut against the flat-top supporting plastic cap 34, and presses that plastic cap 34 to spread the open ends of segments 14D of the center post cylinder 14, into good electrical contact with depolarizer cylinder 16. In addition, the cell top 36 is pressed down tightly against the top edge surface 22A of the anode cylinder 22 for good electrical contact.

The manner in which the elements of the cell are assembled during manufacture, and their respective cooperating functions may now be considered. The outer steel can 12 is initially open at the top to permit ready insertion of the elements.

The depolarizer collector 14 is a deep cylindrical metallic steel cup, preferably of metal that is the same as the can to avoid generation of a potential difference in the electro-chemical environment of the cell. The metal used for the collector 14 is preferably resilient and the collector is provided with several longitudinal slots 14B, to provide several longitudinal segments to be slightly spread readily to engage the inner depolarizer cylinder 16, with a certain amount of pressure for good electrical contact. The collector 14 is coaxially positioned in the steel outer can 12 and is welded to the can 12, which is then ready to receive the operating components of the cell.

The inner depolarizer cylinder 16 is then slipped over the depolarizer collector 14, and is pressed down to seat against the bottom inner surface of the steel can 12. The outer depolarizer cylinder 28 is then assembled onto its supporting steel sleeve 30, and the combination of depolarizer cylinder 28 and sleeve 30 is slip fitted into the steel outer can 12 to rest snugly against the inner surface of the vertical wall 12A of the can 12; the outer insulating separator 26 as a cylinder is then fitted within the outer depolarizer cylinder 28. The inner insulating cylindrical separator 18 is then slipped over concentrically around the inner depolarizer cylinder 16.

At this stage, there is left the annular cylindrical space between the inner separator 18 and the outer separator 26, to receive the anode cylinder 22 and the two associated absorbents, namely, the inner absorbent 20 and the outer absorbent 24. The two absorbents, namely, the inner absorbent 20 and the outer absorbent 24 are assembled as annular cylinders onto the anode cylinder 22, the inner absorbent 20 being fitted within the anode 22, and the outer absorbent 24 being fitted onto the outside of the cylindrical anode 22.

The assembly of the anode 22 and the two absorbents 20 and 24 thereon, is then pressed down into that space between the inner separator 18 and the outer separator 26. It is necessary, however, to provide for insulating the anode cylinder 22, at its bottom end, from the cathode depolarizer cylinders 16 and 28, which seat on the can 12, and to assure that the bottom end of the anode cylinder 22 will remain insulated from the steel outer can 12. For that purpose, an annular insulating seating washer 21, of neoprene, is provided, that is to serve as a seat for the anode cylinder 22 and as an insulator to isolate the anode from the can 12 and from the cathode cylinders 16 and 28. That neoprene insulator 21 is pressed down against the floor of the steel outer can 12, in the space between separator 18 and separator 26, and, in that position, the neoprene insulator also serves as a bracing spacer between the inner separator 18 and the outer separator 26. The two cylindrical absorbents and the anode 22 are then placed in position, namely the inner absorbent 20 and the outer absorbent 24, each resting against the respectively associated separators 18 and 26. The two separators 18 and 26 and anode 22 are inserted far enough to seat on the neoprene insulator 21.

The plastic cap 34 is then placed in position on top of, and to fit into, the depolarizer collector 14 as shown in the assembled figure. The plastic cap 34 embodies the central circular disc 34A, a coaxially depending tapered apron 34B and a peripheral rim flange 34C. When the plastic cap 34 is placed into position, the tapered apron 34B moves axially into the depolarizer collector 14 and impresses slight radial pressure on the fingers 14D of the depolarizer collector 14 to spread the respective arcuate fingers 14D against the inner peripheral surface of the inner depolarizer cylinder 16. At the same time, the central disc 34A seats on the rim edges of fingers 14C of the depolarizer collector 14, and the rim flange 34C of the plastic cap 34 presses downward on the top edge 20A of the inner absorbent cylinder 20 to impress a slight spreading effect on the absorbent material of the cylinder to cause the absorbent material to engage the inner separator 18 and the anode cylinder 22.

The polyethylene annular ring washer 32 is then placed in position around outer separator 26, and seated onto upper rim flange 30A of steel depolarizer sleeve 30, and serves as a mechanical barrier to prevent migration of mercury and particles from the depolarizer cylinder into the space above where such particles might engage the cell top 36. The two surfaces of the polyethylene washer 32 are covered with a suitable sealing film which aids the sealing action and also serves to catch any migratory particles that might reach the washer 32.

The cell top 36 and its grommet seal have already been premolded, and are available in their combined form ready to be applied.

Before applying the top, the electrolyte is dispensed into the cell assembly by a suitable hand syringe and is applied to the top surfaces of the inner and outer absorbents 20 and 24.

The cell top 36 is now placed in position with the grommet 38 now resting on the polyethylene sealing washer 32, and the top is moderately pressed to provide slight compression of the several elements engaged by the top such as the plastic cap and the anode cylinder, and in that position the rim edge 12B of the outer steel can 12 is then crimped over to engage and press against the molded grommet at 38A, to hold the cell top locked in place, under downward axial pressure against anode 22 and plastic cap 34.

In the course of the development of this cell, two separate anodes were originally provided, one for each of the depolarizer cylinders, to permit investigations of each set of units free of any interactions between the two cell units. It was found that the two anode cylinders could be structurally combined, with the consequence of greater strength in the unitary cylinder to permit manual handling during manufacturing assembly of the cell.

The electrolyte which was found to deliver optimum performance at low temperature consisted of seven molar KOH with 2% Zinc-Oxide. The preferred form of the absorbent for retaining the electrolyte consisted of a non-woven mat of polyamide (nylon) fibers.

The cell configuration may be varied, of course, to be adapted to the space and size requirements, and for optimum balanced conditions in the operation of the two-cell units within a single cell, the designs should meet certain conditions as follows:

1. The capacity of the inner depolarizer must balance the capacity of the inner anode.
2. The capacity of the outer depolarizer must balance the capacity of the outer anode.
3. Assuming equal current density at imaginary mid "barrier and absorbent" surfaces, the capacities of the inner and outer cell are to be so adjusted that both are exhausted in equal time periods.

The energy content or capacity will vary of course with the amount of anode material or depolarizer material in the respective elements, which in a small cell, may be measured in terms of milli-ampere hours per cubic inch.

To obtain maximum benefit from the total cell, the two internal half-cells should be formed of such respective energy contents that they will meet the three conditions set forth above. Particularly, the current discharge curves should be relatively of the same form, and the voltages of the respective half-cells should be balanced to prevent internal "hogging," which is an operation as a sink or load, instead of as a source.

The design parameters of the cell and of the components may be determined from use of FIG. 2 as a cell model, with the radial dimensions as marked.

To simplify the relationship of the model cell of FIG. 2 to the actual cell of FIG. 1, the components of FIG. 2 are identified by the same numerals as used for the components of FIG. 1, but preceded by 2—, thus the steel outer can 12 of FIG. 1 corresponds to steel outer can 2–12 of FIG. 2. The difference is that a double anode cylinder structure is provided in FIG. 2, with two cylinders marked 2–22–1 and 2–22–2, as against one cylinder 22 in FIG. 1, for more general analysis. The common anode collector is 2–22–C.

For optimum operation of the cell here shown, the design starts with the following basic conditions or requirements:

1. The capacity of the inner depolarizer 2–16 must balance the capacity of the inner anode 2–22–1. ($C_{ai} = 0.92\ C_{di}$; $ai$ is anode inner; $di$ is depolarizer inner.)
2. The capacity of the outer depolarizer 2–28 must balance the capacity of the outer anode 2–22–2. ($C_{ao} = 0.92\ C_{do}$; $ao$ is anode outer; $do$ is depolarizer outer.)
3. Assuming equal current density at imaginary mid "barrier and absorbent" surfaces, capacities of the inner and outer cell are to be so adjusted that both are exhausted in equal time periods.

In the derivations to follow, symbols are assigned as follows, related to FIG. 2:

W = Thickness of inner depolarizer 2–16
X = Thickness of inner anode 2–22–1
Y = Thickness of outer anode 2–22–2
Z = Thickness of outer depolarizer 2–28
S = Thickness of inner 2–20, and outer 2–24 separator (variable of "barrier and absorbent" assigned)
$D_i$ = Diameter of inner boundary (fixed for any given can design)
$D_o$ = Diameter of outer boundary (fixed for any given can design)
$h_{ai}$ = Height of inner anode 2–22–1 [a]
$h_{di}$ = Height of inner depolarizer 2–16 [a]
$h_{ao}$ = Height of outer anode 2–22–2 [a]
$h_{do}$ = Height of outer depolarizer 2–28 [a]
$\Phi_a$ = Intrinsic anode material capacity, in mah/cubic in.
$\Phi_d$ = Intrinsic depolarizer material capacity
$\phi_{ai1}$ = Diameter $a$—anode, $i$—inner, 1—inner diameter
$\phi_{do2}$ = Diameter $d$—depolarizer, $o$—outer, 2—outer diameter
$V_e$ = Electrode volume The general expression for the capacity of an annular cylinder electrode will appear frequently in the derivations to follow:

$$Ce = \Phi_e V_e = \Phi\ \pi/4 h_e\ (\phi e(\ )_2^2 - \phi_e(\ )1^2),$$

where
( ) represents $a$ for anode, or $d$ for depolarizer.

Method for solution

I. From requirement 1 above establish the relationship for balanced capacity between W and X, and solve W as a function of X.

II. From requirement 2 above establish the relationship for balanced capacity between Z and Y, and solve for Y as a function of Z.

III. From requirement 3 above establish the relationship between W and Z, and solve for Z as a function of W.

---
[a] Fixed by cell design.

IV. Assign a small value to X, (say .001")
evaluate W from part I,
evaluate Z from part III,
evaluate Y from part II,
evaluate $(X+Y+Z+W)$ and
compare to total available space.

If $(X+Y+Z+W)$ is less than available space increment X by 0.001 and continue until $(X+Y+Z+W)$ is equal or greater than available space. From the then values of X, Y, Z, W, compute the values of the electrode diameters, the electrode capacities, and the total anode and depolarizer capacities.

Part I $C_{ai} = 0.92\ C_{di}$ $$C_{ai} = \Phi_a V_{ai} = \Phi_a \pi/4\, h_{ai}(\phi_{ai2}^2 - \phi_{ai1}^2) = A(\phi_{ai2}^2 - \phi_{ai1}^2)$$

$$\phi_{ai2} = D_i + 2W + 2S + 2X$$

$$\phi_{ai1} = D_i + 2W + 2S$$

$$\phi_{ai2}^2 - \phi_{ai1}^2 = 4D_iX + 8WX + 8SX + 4X^2$$

$$C_{ai} = A(\phi_{ai2}^2 - \phi_{ai1}^2) = A(4D_iX + 8WX + 8SX + 4X^2)$$

$$C_{ai} = A(4D_iX + 8WX + 8SX + 4X^2) \quad \text{Eq. 1}$$

where $$A = \Phi_a \pi/4\, h_{ai}$$

also:

$$C_{ai} = 0.92\ C_{di} = 0.92\ \Phi_d V_{di}$$
$$= 0.92\ \Phi_d \pi/4\, h_{di}(\phi_{di2}^2 - \phi_{di1}^2) = B(\phi_{di2}^2 - \phi_{di1}^2)$$

$$\phi_{di2} = D_i + 2W$$

$$\phi_{di1} = D_i$$

$$\phi_{di2}^2 - \phi_{di1}^2 = 4D_iW + 4W^2$$

$$C_{ai} = B(\phi_{di2}^2 - \phi_{di1}^2) = B(4D_iW + 4W^2)$$

$$C_{ai} = B(4D_iW + 4W^2) \quad \text{Eq. 2}$$

where $$B = 0.92\ \Phi_d \pi/4\, h_{di}$$

Now combine eqs. 1 and 2 and solve for $W = f(X)$:

$$A(4D_iX + 8WX + 8SX + 4X^2) = B(4D_iW + 4W^2)$$

$$AD_iX + 2AWX + 2ASX + AX^2 = BD_iW + BW^2$$

$$\overbrace{(B)}^{A_1}W^2 + \overbrace{(BD_i - 2AX)}^{B_1}W + \overbrace{(-AD_iX - 2ASX - AX^2)}^{C_1} = 0$$

$$\left.\begin{array}{l}
A_1 = B \\
B_1 = BD_i - 2AX \\
C_1 = AD_iX - 2ASX - AX^2 \\
A = \Phi_a \pi/4\, h_{ai},\ B - 0.92\ \Phi\pi/4\, h_{di} \\
W = \dfrac{-B_1 \pm \sqrt{B_1^2 - 4A_1C_1}}{2A_1}
\end{array}\right\} \text{Eq. 3}$$

Part II $C_{ao} = 0.92\ C_{do}$ $$C_{ao} = \Phi_a V_{ao} = \Phi_a \pi/4\, h_{ao}(\phi_{ao2}^2 - \phi_{ao1}^2) = C(\phi_{ao2}^2 - \phi_{ao1}^2)$$

$$\phi_{ao2} = D_o - 2Z - 2S$$

$$\phi_{ao1} = D_o - 2Z - 2S - 2Y$$

$$\phi_{ao2}^2 - \phi_{ao1}^2 = 4D_oY - 8ZY - 8SY - 4Y^2$$

$$C_{ao} = C(\phi_{ao2}^2 - \phi_{ao1}^2) = C(4D_oY - 8ZY - 8SY - 4Y^2)$$

$$C_{ao} = C(4D_oY - 8ZY - 8SY - 4Y^2) \quad \text{Eq. 4}$$

where $$C = \Phi_a \pi/4\, h_{ao}$$

also $$C_{ao} = 0.92\ C_{do} = 0.92\ \Phi_d V_{do}$$
$$= 0.92\ \Phi_d \pi/4\, h_{do}(\phi_{do2}^2 - \phi_{do1}^2) = D(\phi_{do2}^2 - \phi_{do1}^2)$$

$$\phi_{do2} = D_o$$

$$\phi_{do1} = D_o - 2Z$$

$$\phi_{do2}^2 - \phi_{do1}^2 = 4D_oZ - 4Z^2$$

$$C_{ao} = D(\phi_{do2}^2 - \phi_{do1}^2) = D(4D_oZ - 4Z^2)$$

$$C_{ao} = D(4D_oZ - 4Z^2) \quad \text{Eq. 5}$$

where $$D = 0.92\ \Phi_d \pi/4\, h_{do}$$

Now combine eqs. 4 and 5 and solve for $Y = f(Z)$:

$$C(4D_oY - 8ZY - 8SY - 4Y^2) = D(4D_oZ - 4Z^2)$$
$$-CD_oY + 2CZY + 2CSY + CY^2 = -DD_oZ + DZ^2$$

$$\overbrace{(C)}^{A_2}Y^2 + \overbrace{(2CZ + 2CS - CD_o)}^{B_2}Y + \overbrace{DD_oZ - DZ^2}^{C_2} = 0$$

$$\left.\begin{array}{l}
A_2 = C \\
B_2 = 2CZ + 2CS - CD_o \\
C_2 = DD_oZ - DZ^2 \\
C = \Phi_a \pi/4\, h_{ao},\ D - 0.92\ \Phi_d \pi/4\, h_{do} \\
Y = \dfrac{-B_2 \pm \sqrt{B_2^2 - 4A_2C_2}}{2A_2}
\end{array}\right\} \text{Eq. 6}$$

Part III

In the derivations of part III we will require additional symbols as follows:

$D_{si}$ Diameter of inner mid "absorbent and barrier" surface
$D_{so}$ Diameter of outer mid "absorbent and barrier" surface
$h_{si}$ Effective height of inner mid "absorbent and barrier" surface
$h_{so}$ Effective height of outer mid "absorbent and barrier" surface
$A_{si}$ Effective area of inner mid "absorbent and barrier" surface
$A_{so}$ Effective area of outer mid "absorbent and barrier" surface
$J$ Desired uniform current density at inner and outer mid "absorbent and barrier" surface
$I_i$ Total current in inner cell
$I_o$ Total current in outer cell
$T_e$ Desired uniform time to exhaustion for both inner cell and outer cell.

In general the formula for the area of a cylindrical surface is:

$$A_s = \pi D_s h_s$$

Also the formula for the total current crossing a surface is:

$$I_s = J A_s$$

Also the formula for the capacity of an electrode discharged to exhaustion is:

$$C_e = I_s T_e = J A_s T_e$$

For the inside cell:

$$D_{si} = D_i + 2W + S$$
$$A_{si} = \pi D_{si} h_{si} = \pi h_{si}(D_i + 2W + S)$$
$$I_i = J A_{si} = J\pi h_{si}(D_i + 2W + S)$$
$$C_i = I_i T_e = J A_{si} T_e = J\pi h_{si}(D_i + 2W + S)T_e$$

For the outside cell:

$$D_{so} = D_o - 2Z - S$$
$$A_{so} = \pi D_{so} h_{so} = \pi h_{so}(D_o - 2Z - S)$$
$$I_o = J A_{so} = J\pi h_{so}(D_o - 2Z - S)$$
$$C_o = I_o T_e = J A_{so} T_e = J\pi h_{so}(D_o - 2Z - S)T_e$$

Since the capacity of a cell discharged to exhaustion is the anode capacity we have from equations 2 and 5:

$$C_i = C_{ai} = B(4D_iW + 4W^2)$$
$$C_o = C_{ao} = D(4D_oZ - 4Z^2)$$
$$J\pi h_{si}(D_i + 2W + S)T_e = B(4D_iW + 4W^2)$$
$$J\pi h_{so}(D_o - 2Z - S)T_e = D(4D_oZ - 4Z^2)$$

and

Dividing the second equation into the first:

$$\frac{J\pi h_{si}(D_i + 2W + S)T_e}{J\pi h_{so}(D_o - 2Z - S)T_e} = \frac{B(4D_iW + 4W^2)}{D(4D_oZ - 4Z^2)}$$

$$\frac{h_{si}(D_i + 2W + S)}{h_{so}(D_o - 2Z - s)} = \frac{B(D_iW + W^2)}{D(D_oZ - Z^2)}$$

$$\frac{(D_i+2W+S)}{(D_o-2Z-S)} = \frac{h_{so}B}{h_{si}D} \cdot \frac{(D_iW+W^2)}{(D_oZ-Z^2)}$$

$$\frac{(D_i+2W-S)}{(D_o-2Z-S)} = \frac{R(D_iW+W^2)}{(D_oZ-Z^2)}$$

where $$R = \frac{h_{so}B}{h_{si}D} = \frac{h_{so}}{h_{si}} \cdot \frac{0.92 \; \Phi_d\pi/4\, h_{di}}{0.92 \; \Phi_d\pi/4\, h_{do}} = \frac{h_{so}h_{di}}{h_{si}h_{do}}$$

$(D_i+2W+S)(D_oZ-Z^2) = R(D_o-2Z-S)(D_iW+W^2)$ $D_iD_oZ - D_iZ^2 + 2D_oWZ - 2WZ^2 + D_oSZ - SZ^2 = RD_oD_iW$
$+ RD_oW^2 - 2RD_iZW - 2RZW^2 - RD_iSW - RSW^2 - D_iD_oZ$
$+ D_iZ^2 - 2D_oWZ + 2WZ^2 - D_oSZ + SZ^2 + RD_oD_iW + RD_oW^2$
$- 2RD_iZW - 2RZW^2 - RD_iSW - RSW^2 = 0$ $$\overbrace{(D_i+2W+S)}^{A_3}Z^2$$

$$+\overbrace{(-D_iD_o-2D_oW-D_oS-2RD_iW-2RW^2)}^{B_3}Z$$

$$\overbrace{(RD_oD_iW+RD_oW^2-RD_iSW-RSW^2)}^{C_3}=0$$

$A_3 = D_i + 2W + S$
$B_3 = D_iD_o - 2D_oW - D_oS - 2RD_iW - 2RW^2$
$C_3 = R(D_oD_iW + D_oW^2 - D_iSW - SW^2)$ $$R = \frac{h_{so}h_{di}}{h_{si}h_{do}}$$

$$Z = \frac{-B_3 \pm \sqrt{B_3^2 - 4A_3C_3}}{2A_3} \qquad \text{Eq. 7}$$

Part IV

In the preceding parts I, II and III, we have expressed the electrode thickness X, Y, Z and W in the following functional relationships:

$W = f(X)$ Equation 3
$Z = f(W)$ Equation 7
$Y = f(Z)$ Equation 6

If a value is assigned to X, then
a value may be computed for W from Eq. 3,
a value may be computed for Z from Eq. 7,
a value may be computed for Y from Eq. 6.

Now the sum $X+W+Z+Y$ can be computed and compared with the total space available. If $X+W+Z+Y$ is less than the space available, a new larger value is assigned to X, a new larger sum is computed and compared with the total space available and this process is continued until an assigned value of X yields a sum $X+W+Z+Y$ which satisfies the total space available. Now from the then values of X, W, Z and Y, all electrode dimensions and capacities may be calculated.

We will define the following additional variables and proceed with the solution:

T = Thickness of anode current collector (assigned)
TSA = Total space available
DIDI = Diameter—inside of inner depolarizer
DODI = Diameter—outside of inner depolarizer
DIAI = Diameter—inner of inner anode
DOAI = Diameter—outer of inner anode
DIAO = Diameter—inner of outer anode
DOAO = Diameter—outer of outer anode
DIDO = Diameter—inner of outer depolarizer
DODO = Diameter—outer of outer depolarizer
CAI = Capacity of inner anode
CDI = Capacity of inner depolarizer
CAO = Capacity of outer anode
CDO = Capacity of outer depolarizer
SUM = $(X+W+Z+Y+2S+T)$ From the geometry of the cell:

$D_i + 2W + 2S + 2X + 2T + 2Y + 2S + 2Z = D_o$
$D_o - D_i = 2W + 2S + 2X + 2T + 2Y + 2S \; 2Z$ $$\frac{D_o - D_i}{2} = X + W + Z + Y + 2S + T$$

$$\frac{D_o - D_i}{2} = X + W + Z + Y + 2S + T = SUM$$

But also $$TSA = \frac{D_o - D_i}{2}$$

Assign a value to X, (start low),
Compute SUM,
Compute TSA,

If SUM ≅ TSA then the assigned value of X, and the computed values of W, Z and W will satisfy the requirements of the cell design is on page 13. If SUM < TSA then increment X and repeat SUM, etc.

Electrode dimensions and capacities in terms of X, W, Y and Z are:

DIDI = $D_i$
DODI = $D_i + 2W$
DIAI = $D_i + 2W + 2S$ = DODI + 2S
DOAI = $D_i + 2W + 2S + 2X$ = DIAI + 2X
DODO = $D_o$
DIDO = $D_o - 2Z$
DOAO = $D_o - 2Z - 2S$ = DIDO - 2S
DIAO = $D_o - 2Z - 2S - 2Y$ = DOAO - 2Y
CAI = $B(4D_iW + 4W^2)$
CDI = CAI/0.92
CAO = $D(4D_oZ - 4Z^2)$
CDO = CAO/0.92
Total C = CAI + CAO As indicated here, the two anodes of the model cell of FIG. 2 are combined in the actual cell of FIG. 1.

In accordance with the foregoing procedure, the parameters of the cell components may be varied according to imposed dimensional limitations and optimum designs may be developed, without departing from the spirit and scope of the invention as defined in the claims.

What is claimed is:

1. A cylindrical primary electric cell comprising:
   two cylindrical positive electrodes, each containing mercuric oxide active depolarizing material;
   two cylindrical zinc negative electrodes disposed between said two positive electrodes, thereby forming inner and outer cell pairs;
   separators separating said positive and negative electrodes; and
   an alkaline electrolyte,
   said cell characterized as follows:
   (1) the capacity of the depolarizer of the inner cell balances the capacity of the anode of the inner cell;
   (2) the capacity of the depolarizer of the outer cell balances the capacity of the anode of the outer cell; and
   (3) at equal current density at the midpoint of each cell pair, the capacities of the inner and outer cells are exhausted in equal time periods;
   (4) the two cathode depolarizers are formed and filled with equivalent contents of electrical energy, measured in total milliampere-hours causing both cell units to be exausted in equal time periods.

2. A cylindrical primary electric cell, as in claim 1 in which the capacity of each cathode depolarizer is substantially equal to the capacity of the other where the capacity is the integral of the product of current times volume.

3. A cylindrical primary electric cell, as in claim 1, in which
said cell is disposed in and enclosed within a steel container can that serves as an electrode terminal of one polarity of the cell, and that has a central axis;
an electrically-conductive cylinder is disposed concentrically along said axis and is welded at one end to said can, and serves as an internal peripheral support and a collector for the inner depolarizer structure;
a top cover closes said container can and insulates said cover from said can, and serves as the cell electrode of opposite polarity of the cell;
means are present which establish electrical contact between said anode and said top cover;
and a second metallic support for said second depolarizer structure is disposed in electrical contact with said steel outer can as said one electrode of the cell.

4. A cylindrical primary electric cell, as in claim 1, comprising further,
a housing for the cell, having a metal cup for containing said anode and cathode structures, and having a metal closure cap insulated from the metal cup and disposed to close and seal the housing;
means within said housing for maintaining said cathode structures in electrical conductive relationship to said metal cup;
and means within said housing for maintaining said anode structure in electrical conductive relationship to said metal closure cap.

5. A cylindrical primary electric cell, as in claim 3, wherein the depolarizer collector comprises a resilient steel material and is provided with a multiplicity of longitudinal segments or fingers, said fingers adapted to impress a slight radial pressure against the inner peripheral surface of the inner depolarizer cylinder.

6. A cylindrical primary electric cell, as in claim 5, in which a plastic cap is placed in position on top of and to fit into said depolarizer collector, said plastic cap having a central circular disc, a coaxially depending tapered boss, and a peripheral rim flange, so that when the plastic cap is placed into position, the central disc thereof seats on the rim edges of the fingers of the depolarizer collector, the rim flange thereof presses downward on the top edge of an inner absorbent cylinder separating the anode and the inner depolarizer, and the tapered boss of the plastic cap moves axially into the depolarizer collector to spread the respective arcuate fingers thereof against the inner peripheral surface of the inner depolarizer cylinder.

7. A cylindrical primary electric cell as in claim 1, wherein said alkaline electrolyte consists of seven molar KOH with 2% ZnO.

8. A cylindrical pirmary electric cell comprising, a steel outer can of relatively cup shape; a central coaxially disposed hollow metal cylindrical depolarizer collector, also cup shaped and welded at its bottom to the steel outer can; an inner annular cylinder of depolarizer material surrounding and supported by said metal collector; an inner cylindrical separator surrounding and engaging said depolarizer cylinder; an inner cylinder of absorbent material surrounding and engaging said inner separator; a porous amalgamated zinc anode cylinder disposed to surround and engage said inner absorbent; an annular insulator seating washer to serve as a seat for the anode cylinder, to thereby insulatingly separate the anode cylinder from the steel outer can and the depolarizer cylinders; an outer cylindrical absorbent disposed to surround and engage the anode cylinder; an outer separator of insulating material surrounding and engaging said absorbent; an outer or second cylinder of depolarizer material supported and confined by a steel sleeve to surround and engage said outer separator, with said steel sleeve of appropriate dimension to snugly slip-fit into the vertical side wall of the steel outer can of the cell; an insulating polyethylene annular washer to seat on the steel sleeve, and to serve as a barrier against migration of depolarizer particles to the space above said washer; a central coaxial plastic cap having a central circular planar body to support the central area of the cell top to prevent buckling of that top, said plastic cap supported by said coaxial depolarizer collector which serves as a centerpost for the cell; said coaxial depolarizer collector slotted longitudinally with a multiplicity of slots so the open free ends of the collector may be shifted slightly radially outward; said cap further embodying a tapered coaxial boss that extends coaxially downward into said cylindrical centerpost to slightly spread the free ends thereof radially outward into good electrical contact, under pressure, with the inner depolarizer cylinder; said two cathode depolarizer cylinders disposed to be independently electrically operative as a cell unit with said anode structure, and are formed and filled with equivalent contents of electrochemical energy, measured in total milliampere-hours so that both cell units are exhausted in equal time periods.

References Cited

UNITED STATES PATENTS

| | | | |
|---|---|---|---|
| 3,530,496 | 9/1970 | Amano et al. | 136—30 |
| 3,716,411 | 2/1973 | Ogawa et al. | 136—30 |
| 2,712,565 | 7/1955 | Williams, Jr. | 136—107 |
| 2,822,416 | 2/1958 | Parkinson | 136—107 |

ANTHONY SKAPARS, Primary Examiner

U.S. Cl. X.R.

136—30, 107, 111